(12) United States Patent
Biemer et al.

(10) Patent No.: US 10,380,439 B2
(45) Date of Patent: Aug. 13, 2019

(54) VEHICLE SENSING SYSTEM FOR DETECTING TURN SIGNAL INDICATORS

(71) Applicant: MAGNA ELECTRONICS INC., Auburn Hills, MI (US)

(72) Inventors: Michael Biemer, Aschaffenburg-Obernau (DE); Ruediger Boegel, Großostheim (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/695,380

(22) Filed: Sep. 5, 2017

(65) Prior Publication Data

US 2018/0068191 A1    Mar. 8, 2018

Related U.S. Application Data

(60) Provisional application No. 62/383,792, filed on Sep. 6, 2016.

(51) Int. Cl.
  *G06K 9/00* (2006.01)
  *B60R 11/04* (2006.01)
  *G06T 7/70* (2017.01)
  *G06T 7/11* (2017.01)
  *B60R 11/00* (2006.01)

(52) U.S. Cl.
  CPC .......... *G06K 9/00825* (2013.01); *B60R 11/04* (2013.01); *G06T 7/11* (2017.01); *G06T 7/70* (2017.01); *B60R 2011/0001* (2013.01)

(58) Field of Classification Search
  CPC ........ B60R 11/04; G06K 9/00825; G06T 7/11

USPC ......................................................... 348/148
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,760,962 A | 6/1998 | Schofield et al. |
| 5,786,772 A | 7/1998 | Schofield et al. |
| 5,796,094 A | 8/1998 | Schofield et al. |
| 5,877,897 A | 3/1999 | Schofield et al. |
| 5,929,786 A | 7/1999 | Schofield et al. |
| 5,949,331 A | 9/1999 | Schofield et al. |
| 6,201,642 B1 | 3/2001 | Bos |
| 6,222,447 B1 | 4/2001 | Schofield et al. |
| 6,302,545 B1 | 10/2001 | Schofield et al. |
| 6,396,397 B1 | 5/2002 | Bos et al. |
| 6,498,620 B2 | 12/2002 | Schofield et al. |
| 6,523,964 B2 | 2/2003 | Schofield et al. |

(Continued)

*Primary Examiner* — Jamie J Atala
*Assistant Examiner* — Kathleen V Nguyen
(74) *Attorney, Agent, or Firm* — Honigman LLP

(57) ABSTRACT

A vision system for a vehicle includes a camera disposed at the vehicle and having a field of view exterior of the vehicle. A control, via processing of image data captured by the camera, is operable to detect the presence of a vehicle and a blinking light source in the field of view of the camera. The control, via processing of captured image data, determines an angle of the detected vehicle relative to the equipped vehicle and, responsive to determination of the angle, determines a middle region of an end of the detected vehicle. Responsive to detection of the vehicle and the blinking light source, the vision system is operable to determine whether the detected blinking light source is a left turn signal indicator of the detected vehicle or a right turn signal indicator of the detected vehicle.

20 Claims, 21 Drawing Sheets

(56) References Cited

U.S. PATENT DOCUMENTS

| | | |
|---|---|---|
| 6,611,202 B2 | 8/2003 | Schofield et al. |
| 6,636,258 B2 | 10/2003 | Strumolo |
| 6,690,268 B2 | 2/2004 | Schofield et al. |
| 6,717,610 B1 | 4/2004 | Bos et al. |
| 6,757,109 B2 | 6/2004 | Bos |
| 6,802,617 B2 | 10/2004 | Schofield et al. |
| 6,806,452 B2 | 10/2004 | Bos et al. |
| 6,822,563 B2 | 11/2004 | Bos et al. |
| 6,882,287 B2 | 4/2005 | Schofield |
| 6,891,563 B2 | 5/2005 | Schofield et al. |
| 6,946,978 B2 | 9/2005 | Schofield |
| 7,005,974 B2 | 2/2006 | McMahon et al. |
| 7,038,577 B2 | 5/2006 | Pawlicki et al. |
| 7,145,519 B2 | 12/2006 | Takahashi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,859,565 B2 | 12/2010 | Schofield et al. |
| 7,881,496 B2 | 2/2011 | Camilleri et al. |
| 8,694,224 B2 | 4/2014 | Chundrlik, Jr. et al. |
| 8,818,042 B2 | 8/2014 | Schofield et al. |
| 8,886,401 B2 | 11/2014 | Schofield et al. |
| 8,917,169 B2 | 12/2014 | Schofield et al. |
| 9,068,390 B2 | 6/2015 | Ihlenburg et al. |
| 9,077,098 B2 | 7/2015 | Latunski |
| 9,077,962 B2 | 7/2015 | Shi et al. |
| 9,090,234 B2 | 7/2015 | Johnson et al. |
| 9,092,986 B2 | 7/2015 | Salomonsson et al. |
| 9,140,789 B2 | 9/2015 | Lynam |
| 9,146,898 B2 | 9/2015 | Ihlenburg et al. |
| 9,174,574 B2 | 11/2015 | Salomonsson |
| 9,205,776 B2 | 12/2015 | Turk |
| 9,233,641 B2 | 1/2016 | Sesti et al. |
| 9,305,223 B1 * | 4/2016 | Ogale ................ G06K 9/00825 |
| 2010/0260377 A1 * | 10/2010 | Takahashi .......... G06K 9/00805 |
| | | 382/103 |
| 2012/0299476 A1 * | 11/2012 | Roberts ................ B60Q 1/0011 |
| | | 315/77 |
| 2013/0002873 A1 | 1/2013 | Hess |
| 2013/0141578 A1 | 6/2013 | Chundrlik, Jr. et al. |
| 2013/0215271 A1 | 8/2013 | Lu |
| 2013/0222593 A1 | 8/2013 | Byrne et al. |
| 2013/0242099 A1 | 9/2013 | Sauer et al. |
| 2013/0258077 A1 | 10/2013 | Bally et al. |
| 2013/0278769 A1 | 10/2013 | Nix et al. |
| 2013/0298866 A1 | 11/2013 | Vogelbacher |
| 2013/0300869 A1 | 11/2013 | Lu et al. |
| 2013/0314503 A1 | 11/2013 | Nix et al. |
| 2014/0005907 A1 | 1/2014 | Bajpai |
| 2014/0025240 A1 | 1/2014 | Steigerwald et al. |
| 2014/0028852 A1 | 1/2014 | Rathi |
| 2014/0049646 A1 | 2/2014 | Nix |
| 2014/0052340 A1 | 2/2014 | Bajpai |
| 2014/0067206 A1 | 3/2014 | Pflug |
| 2014/0085472 A1 | 3/2014 | Lu et al. |
| 2014/0098229 A1 | 4/2014 | Lu et al. |
| 2014/0104426 A1 | 4/2014 | Boegel et al. |
| 2014/0138140 A1 | 5/2014 | Sigle |
| 2014/0139676 A1 | 5/2014 | Wierich |
| 2014/0152825 A1 | 6/2014 | Schaffner |
| 2014/0160276 A1 | 6/2014 | Pliefke et al. |
| 2014/0160291 A1 | 6/2014 | Schaffner |
| 2014/0168415 A1 | 6/2014 | Ihlenburg et al. |
| 2014/0168437 A1 | 6/2014 | Rother et al. |
| 2014/0211009 A1 | 7/2014 | Fursich |
| 2014/0218535 A1 | 8/2014 | Ihlenburg et al. |
| 2014/0226012 A1 | 8/2014 | Achenbach |
| 2014/0232869 A1 | 8/2014 | May et al. |
| 2014/0247352 A1 | 9/2014 | Rathi et al. |
| 2014/0247354 A1 | 9/2014 | Knudsen |
| 2014/0247355 A1 | 9/2014 | Ihlenburg |
| 2014/0293042 A1 | 10/2014 | Lynam |
| 2014/0293057 A1 | 10/2014 | Wierich |
| 2014/0307095 A1 | 10/2014 | Wierich |
| 2014/0309884 A1 | 10/2014 | Wolf |
| 2014/0313339 A1 | 10/2014 | Diessner |
| 2014/0320636 A1 | 10/2014 | Bally et al. |
| 2014/0320658 A1 | 10/2014 | Pliefke |
| 2014/0327772 A1 | 11/2014 | Sahba |
| 2014/0327774 A1 | 11/2014 | Lu et al. |
| 2014/0336876 A1 | 11/2014 | Gieseke et al. |
| 2014/0340510 A1 | 11/2014 | Ihlenburg et al. |
| 2014/0347486 A1 | 11/2014 | Okouneva |

* cited by examiner during 'OFF' duration changed to brighter during 'ON' duration
changed to brighter during 'ON' duration

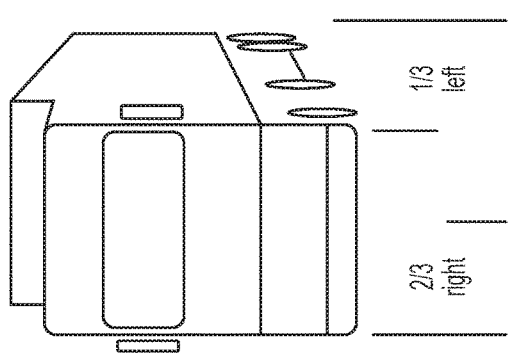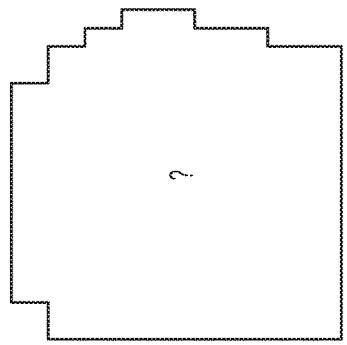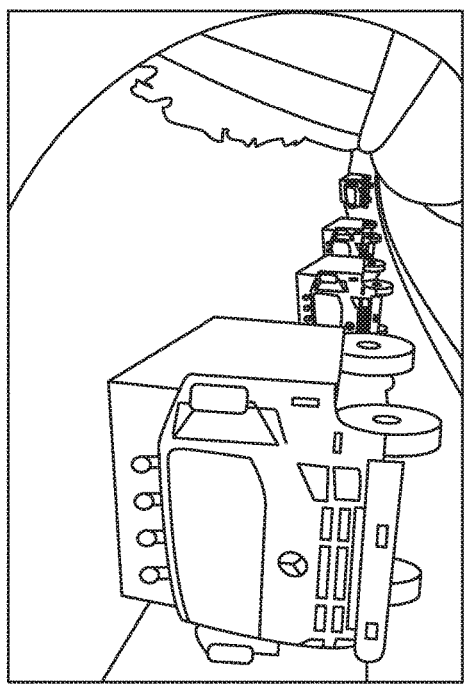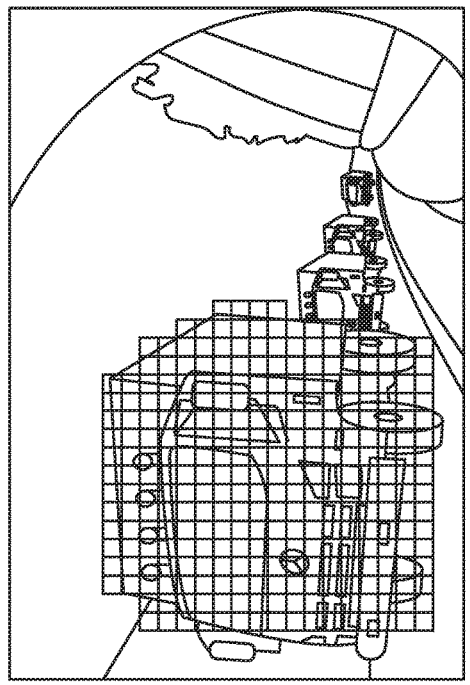
FIG. 8A
FIG. 8B

US 10,380,439 B2

VEHICLE SENSING SYSTEM FOR DETECTING TURN SIGNAL INDICATORS

CROSS REFERENCE TO RELATED APPLICATION

The present application claims the filing benefits of U.S. provisional application Ser. No. 62/383,792, filed Sep. 6, 2016, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and wherein an image processor is operable to process image data captured by the camera to detect the presence of a blinking light source in the field of view of the camera. Responsive to detection of a blinking light source, the vision system determines if the detected blinking light source is a turn signal indicator of another vehicle on the road on which the equipped vehicle is traveling based on a characteristic of the detected blinking light source being within a threshold level corresponding to a characteristic of a turn signal indicator of a vehicle.

The vision system may determine if the detected blinking light source is a turn signal indicator of another vehicle on the road on which the equipped vehicle is traveling based on at least one of (i) a color of the detected blinking light source being within a threshold color range, (ii) the rate of flashing of the detected blinking light source being within a threshold rate, and (iii) the location of the detected blinking light source being within a threshold range of locations for another vehicle. The threshold level may be selected or adjusted responsive to a current geographical location of the equipped vehicle (which may be determined via a communication to the vehicle or a GPS system of the vehicle or the like).

These and other objects, advantages, purposes and features of the present invention will become apparent upon review of the following specification in conjunction with the drawings.

BRIEF DESCRIPTION OF THE DRAWINGS

FIG. 6B shows the vehicle of FIG. 6A at a point of time t2 with its detection grid tiles on the left, shown with the left blinker on;

FIG. 8A shows that, at an angled view onto a moving object, the divide into front and side isn't always half to half and the ratio front to side does not match to left and right;

FIG. 8B shows the shape outlines and a grid applied to the moving object that does not allow to dedicate the TSI-ROIs sufficiently without the shapes divided up in front and side;

DESCRIPTION OF THE PREFERRED EMBODIMENTS

A vehicle vision system and/or driving assist system and/or object detection system and/or alert system and/or control system for a driver assistance and warning system, such as for an autonomous or semi-autonomous vehicle, operates to capture images exterior of the vehicle and may process the captured image data to display images and to detect objects at or near the vehicle and in the predicted path of the vehicle, such as to assist in maneuvering the vehicle. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
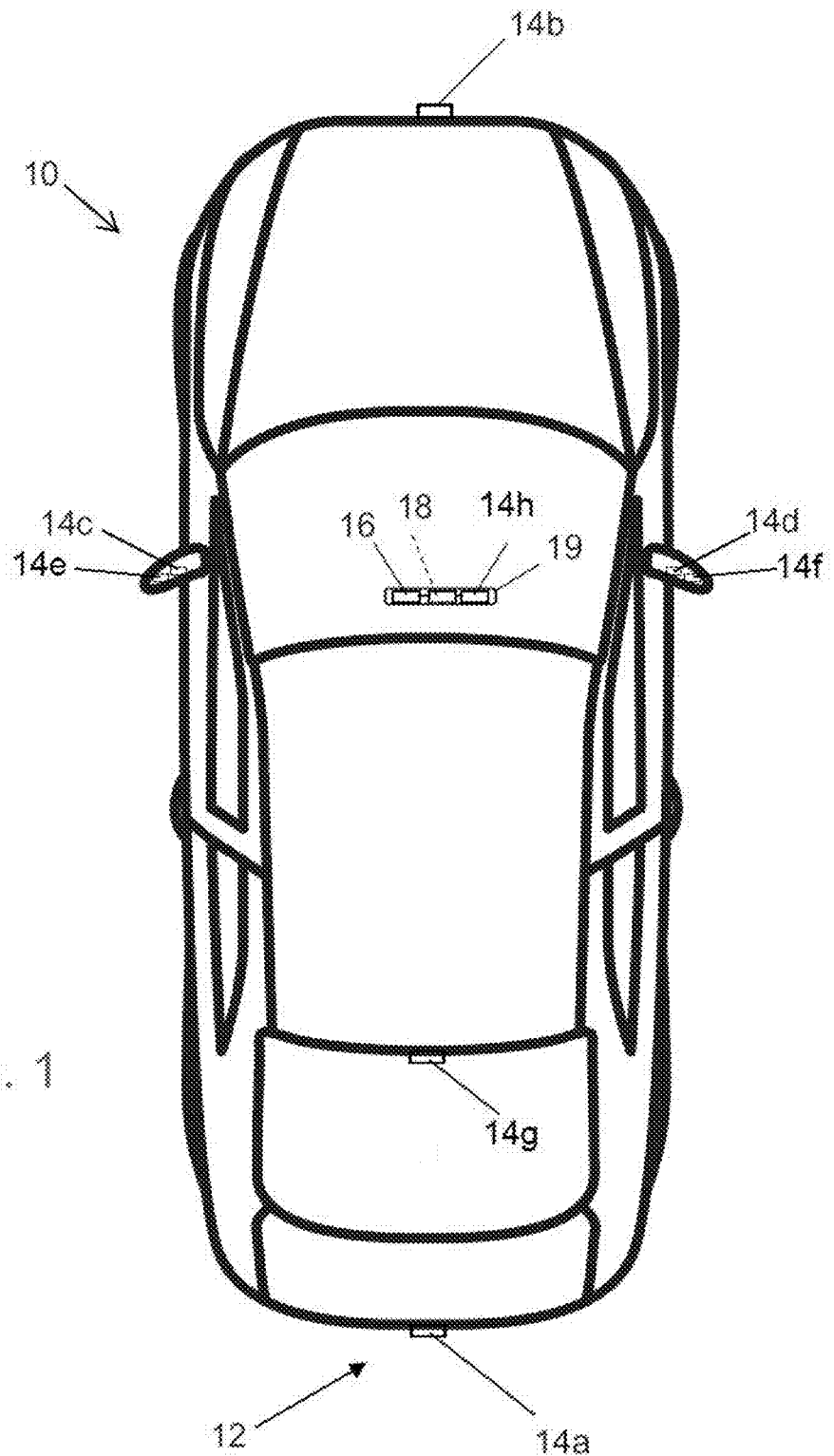
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14*a* (and the system may optionally include multiple exterior facing imaging sensors or cameras, such as a forward viewing camera 14*b* at the front and a forward viewing camera 14*h* at the windshield of the vehicle, and a sideward viewing camera 14*c*, 14*d* at respective sides of the vehicle and another rearward viewing cameras 14*e*, 14*f* integrated to the side mirrors or a wing and another rearward facing camera 14*g* at a rear window of the vehicle), which capture image data representative of the scene occurring exterior of the vehicle, with each of the cameras having a lens for focusing images at or onto an imaging array or imaging plane or imager of the camera (FIG. 1). Optionally, the forward viewing camera (14*h*) may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 19 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Driver assistant systems for aiding the driver to hold its lane are known. Nowadays these often also possess a lane change function, which is typically initiated by the driver setting his or her turn signal indicator (hereinafter referred to as TSI) into the direction of the intended target lane. When the TSI is set, the crossing of the adjacent target lane borderline (typically the lane marking) gets allowed to the system, which than executes the lane change, which is completed when the vehicle is within the target lane's borderlines.

Typically, the driver has to take care about sufficient clearance at the target lane before initiating the lane change. Some systems provide aids and warnings to the driver and/or automated systems by sensing the adjacent lane's clearance. This is typically done by using RADAR sensors, LIDAR sensors or Ultrasound sensors, or optionally cameras. Unlike RADAR sensors, LIDAR sensors and Ultrasound sensors, mono-cameras are not as capable of measuring the distance to objects within the visual scene per se, which makes them a second choice. Algorithms are present to provide distance estimations, such as structure from motion, back projection and plausible size comparison by mono-camera. Stereo cameras are often too expansive and too bulky. Often, it is the desirable to incorporate the adjacent lane sensors within the vehicle side mirror housing, by that the space the sensor can take is more limited. The possible stereo base of a stereo camera and the typical resolution that is available in automotive, such as about two megapixels, is typically too small for delivering a sufficient distance measurement for approaching traffic.

Figure 2:
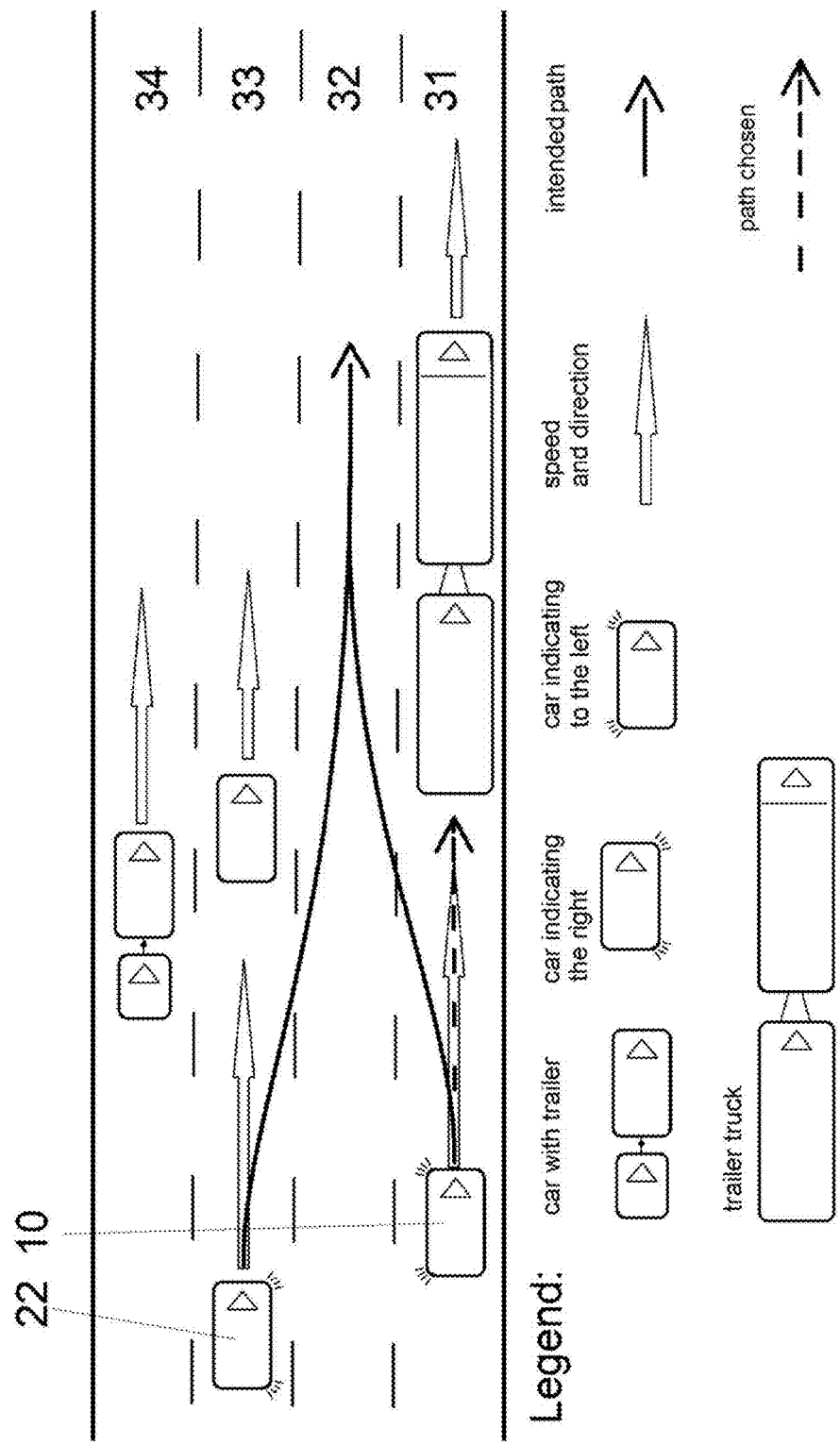
FIG. 2 is a top plan view of a vehicle equipped with the system of the present invention, shown traveling along a multi-lane road with other vehicles, where the solid type of arrows indicate the intended paths, the dotted type of arrows indicate the chosen path and the white outlined type of arrows indicate the vehicle's direction with the length of the arrow indicating the vehicle speed.

Some more advanced systems are capable for object and scene detection by their sensor equipment, data processors, fusion and data processing algorithms, which are capable to sense whether a moving object, such as a vehicle approaching from the blind spot or from behind the equipped vehicle from the lane 31 of the equipped vehicle or from the lane 33 next to the adjacent lane 32 is already directing into the adjacent lane that the driver of the equipped vehicle was intending to change to. This is shown in FIG. 2, where the equipped vehicle 10 is traveling in the right lane and intends to move to the adjacent lane to the left, while another vehicle 22 is two lanes over and intends to move to its adjacent lane to the right (which is the same lane that the equipped vehicle is moving into). Both vehicles have their TSIs set already.

For RADAR sensing systems, LIDAR sensing systems and Ultrasonic sensing systems, it is impossible to detect whether an approaching vehicle has its TSI set. Additionally, the vehicle 22 is in the blind spot of vehicle 10. Known blind spot vehicle detection systems typically do not sense and warn about vehicles in adjacent lanes further than the next lane.

The system of the present invention is capable to sense the blinking of a TSI of an (or multiple) approaching vehicle (both in front or rear the ego vehicle). The regulations of the most countries specify the color room or spectral band of actuated TSIs. Additionally, the regulations of the most countries specify the blinking on and off time for actuated TSIs. For example, Germany's StVO § 54 requires a blinking frequency of 1.5+/−0.5 Hz. The on/off ratio is 55%+/−25%. Many countries also specify the position at which the TSIs have to be mounted at the vehicle.

The system of the present invention may receive the information in which country it actually is. Such information may be provided from a vision processing system, from a navigation system or set by a driver entry.

The system of the present invention may detect the blinking at an approaching object and may determine the blinking to be a TSI by taking its peak light intensity, its blinking time pattern, its color tone and its position on the object into account.

Figure 3:
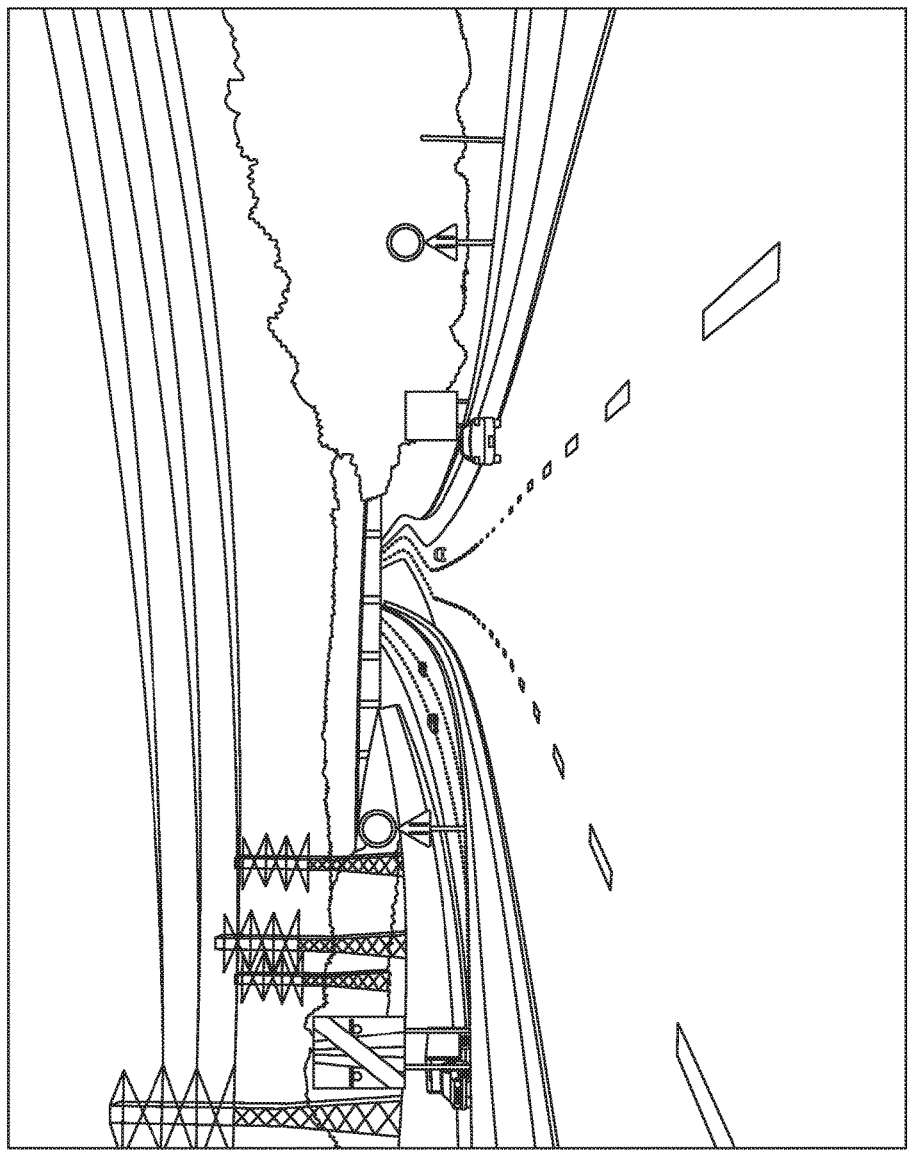
FIG. 3 is a perspective view of an Autobahn scene as it would be captured by a forward viewing camera at an inner mirror position of the vehicle.
Figure 4:
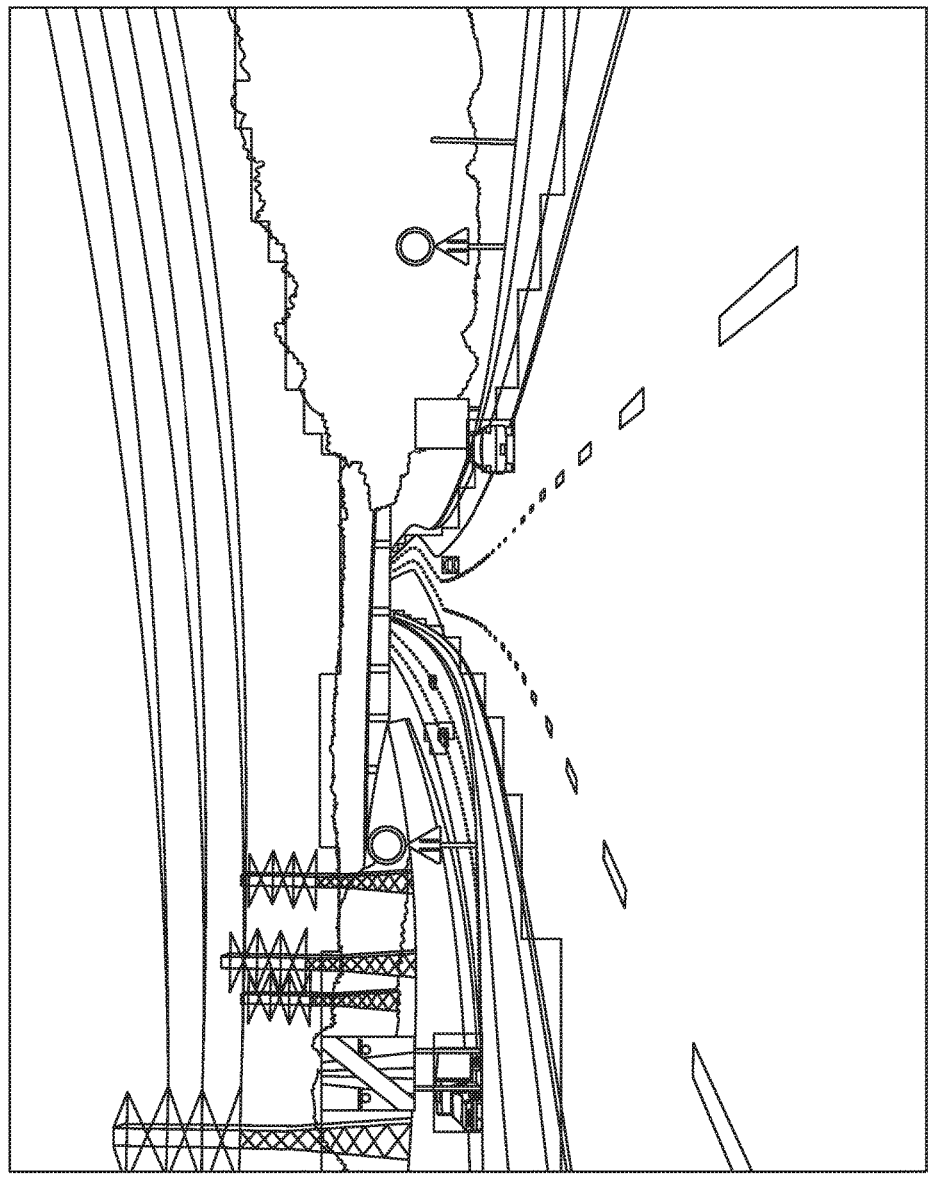
FIG. 4 shows the result of a basic machine vision scene classification algorithm which has classified the scene image of FIG. 3, showing the drivable freespace, the street signs, the road markings, the sky and the road participants classified separately and highlighted by different gray overlays in rough patches (boxes)

The object may have been previously detected and classified by known art scene-('2D Scene classification' in FIG. 17) and object classifiers as being a road participant. Some object classifiers are able to classify the road participant different kinds (moving, non-static traffic), such as trucks, cars, motorcycles or bicycles (newly at Eurobike 2016 at Friedrichshafen the startup LUMOS (https://lumoshelmet.co/) presented a bicycle helmet with an integrated turn indicator), with the exception of pedestrians and rickshaws which typically have no TSIs ('Moving object discrimination' in the flow chart of FIG. 17). FIG. 3 shows a scene captured by a front camera with foreign vehicles in front (towards which the ego vehicle may close or approach). FIG. 4 shows the result of a basic machine vision scene classification algorithm which has classified the scene image of FIG. 3 (past '2D Scene classification' in the flow chart of FIG. 17). The drivable freespace, the street signs, the road markings, the sky and the road participants are classified and separately highlighted by different gray overlays in rough patches (boxes).

The equipped vehicle's position (ego position) may be known or detected by known positioning systems and algorithms, such as GPS or visual systems. The foreign road participant object's position may be known by methods such as by getting the positions told by any kind of V2V communication or by relative object distance and angle detection such as by using RADAR sensing systems, LIDAR sensing systems, stereo camera vision systems or structure from motion processing on mono cameras for scene detection and object mapping (see step 'Shape rotation by relative angle' in the flow chart of FIG. 17).

Figure 11:
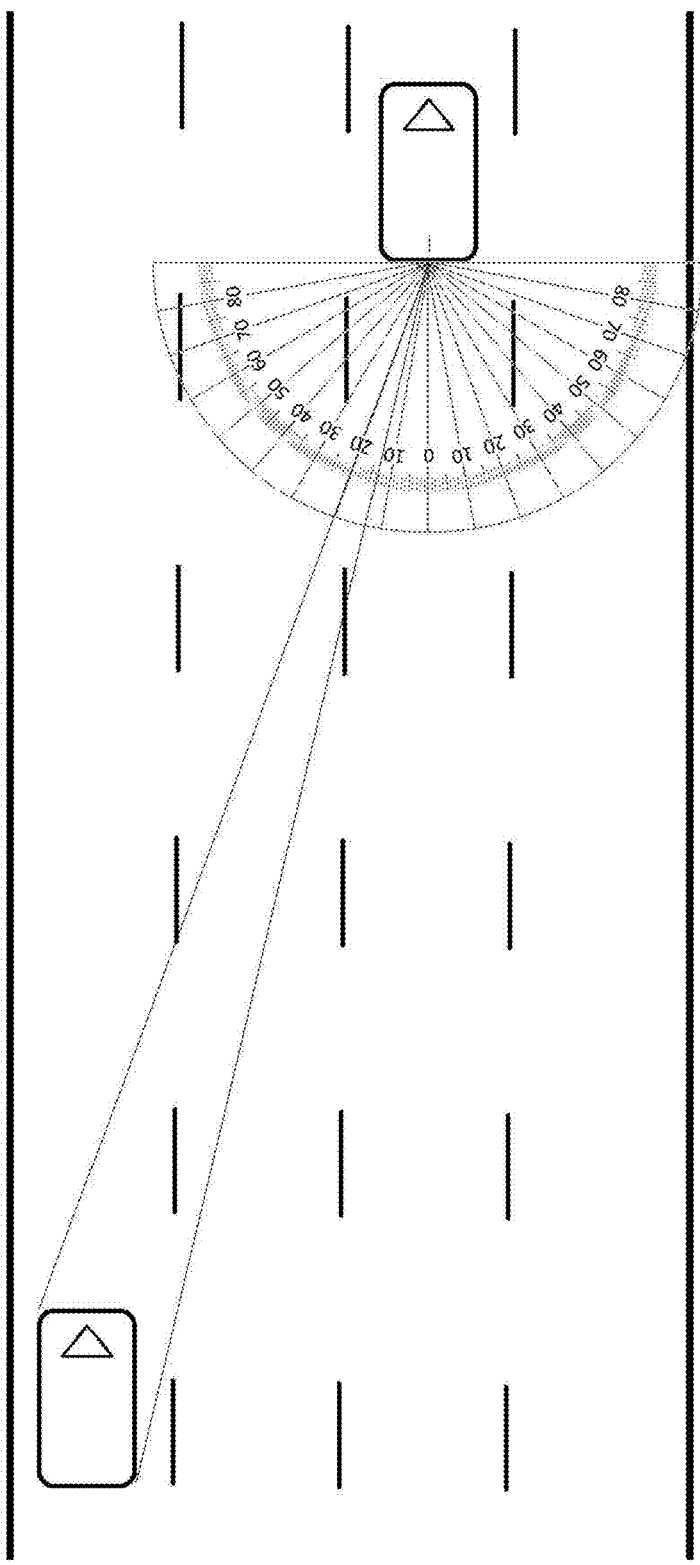
FIG. 11 is a plan view that visualizes the angle at which a vehicle is seen relative to the ego vehicle and gives sufficient indication in which orientation the foreign vehicles is seen by the capturing camera, where the object's borderline angles can be matched to a rotational shape model.

The object detection and classification may output the road participant's borderlines or shapes (eventually used as ROI later such as shown in FIG. 6, if not limited furtherly). By knowing the relative position of the other vehicle, and the angle to it (see FIG. 11), it may be possible to tell whether a road participant blinks on the right side or on the left side, which is the essential information to detect. This works well when a road participant is mostly visible from the rear or from the front (see FIGS. 6 and 7). At a highway the vehicles in front of the equipped vehicle are mostly be seen from the rear and the vehicles behind the equipped vehicle are mostly seen frontal.

Figure 5A:
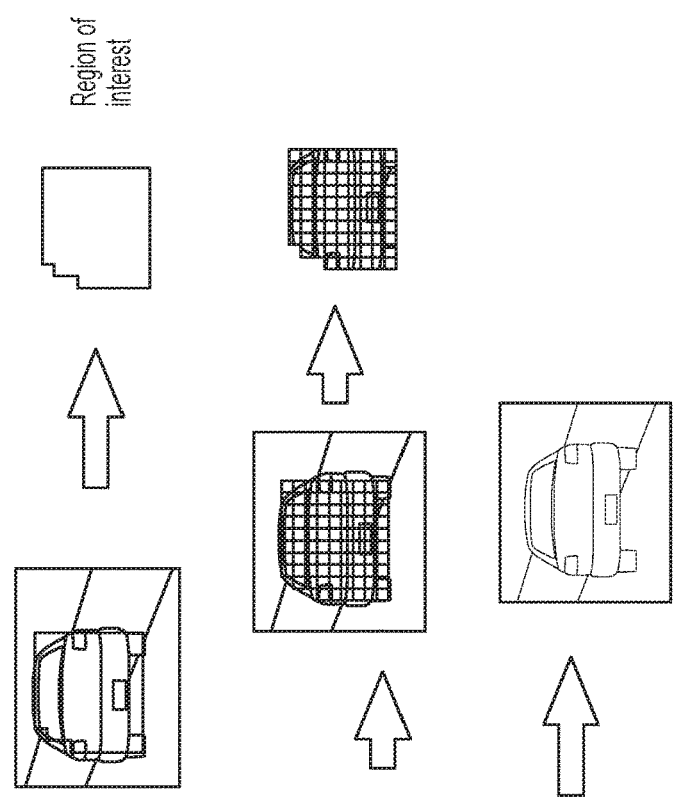
FIG. 5A is a chart showing how a region of interest (ROI) of a moving object gets extracted from the scene or object classification result.
Figure 5A:
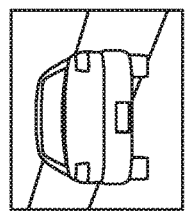
Figure 5B:
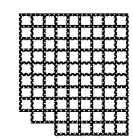
FIG. 5B is the application of a detection tile grid applied onto the ROI from FIG. 5A.

The patch which was classified as a road participant may be used as generally region of interest ROI for detecting blinkers as shown in the chart of FIG. 5A. A detection grid may be applied onto the ROI as shown in FIG. 5B. For determining whether a road participant is blinking the detection areas may always be reduced to the areas of the road participant ROIs. For each tile of the detection grid an average brightness over all pixels of each tile may be calculated. Since the ROI stays with the road participant's object also when the object and the ego vehicle is moving relative to one another over consecutive frames, the ROI's enclosed area stay comparable also in consecutive frames (this assumption is essential for the blinking filtering over consecutive frames visualized in FIG. 21).

Figure 6A:
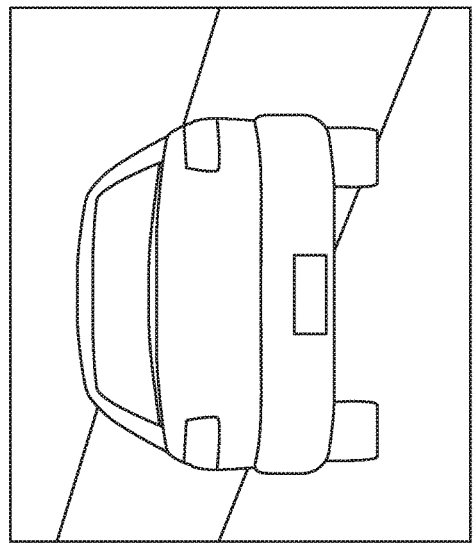
FIG. 6A shows a vehicle from the rear at a point of time t1 at right, shown with the blinker off.
Figure 6B:
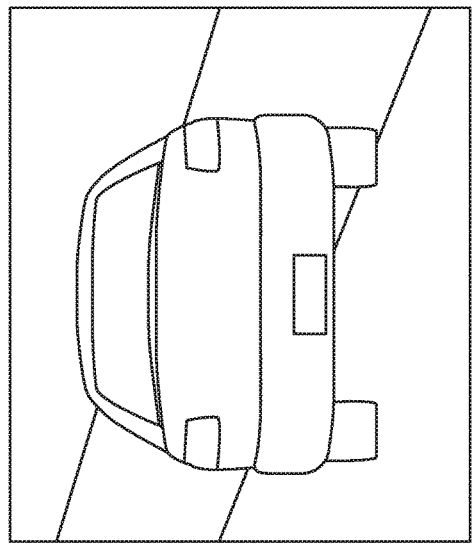
Figure 21:
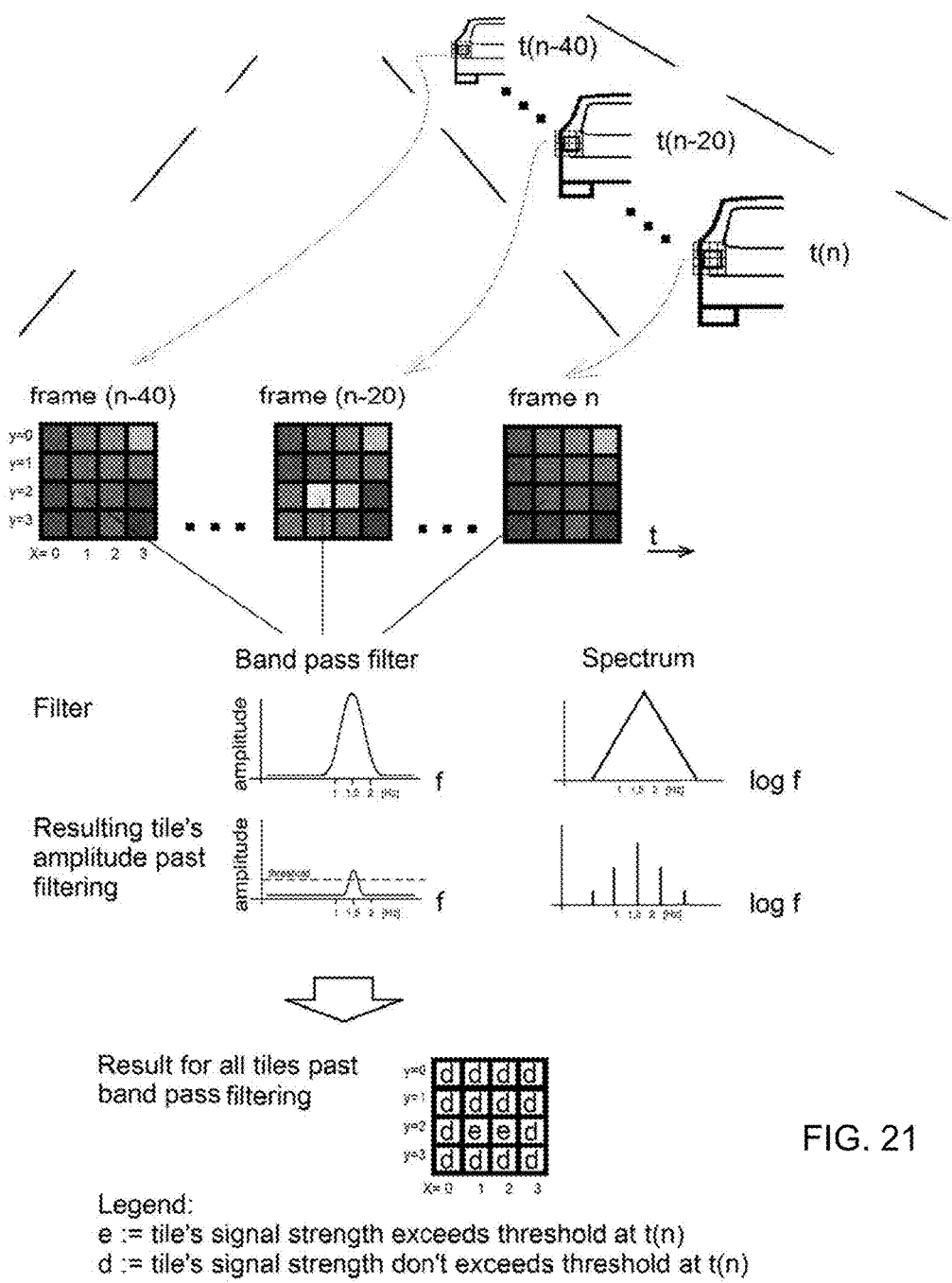
FIG. 21 shows a sequence of consecutive ROI's which were applied to a moving road object according the routine shown in the flow charts of FIGS. 17, 18, 19 in accordance with the chart of FIG. 20, with 60 frames per second each half square wave of a 1.5 Hz signal takes 20 frames, and due to that past 40 frames t(n-40) a 1.5 Hz signal can reliably be filtered in frame n-20 the TSI is ON in frame n and n-40 the TSI is OFF, where the ROI's tiles with signals that exceed a threshold past the band pass filtering detected as blinking at time t(n), and with the filters and the example tile 1, 2 spectrum is shown as well, wherein, as the "Result for all tiles past band pass filtering" shows, the tiles which change the most exceed the threshold of the sequence filtering's amplitude (for further processing).

FIG. 6A shows the same vehicle from the rear at a point of time t1 and FIG. 6B at a point of time t2 with its detection grid tiles, with FIG. 6A having all left blinker off and 6B having the left blinker on. As visible some tiles show a higher brightness average. By comparing all tiles over time, and filtering out a (optionally country-) specific on-off time pattern, blinking can be detected. The timely sequence (typically 1.5 Hz) of the TSI's blinking is comparably slow. To generate a signal whether a 1.5 Hz blinking light signal is present in a TSI's ROI, the system according the invention may use a (timely, not color) 1.5 Hz bandpass filtering over the brightness of each ROI's tile, such as shown in the sequence of FIG. 21. Optionally, the tiles with the highest bandpass out signal may have a dedicated amplification score, which gets risen to high bandpass output signals and diminished when the signal is low. A 2D tracking algorithm may be influenced by the highest signal scored tiles. The ROI may have an attractor in a center region that may always be shifted by a small amount on each frame for fitting the ROI's center to the TSI's center in view accurately.

Seen from the rear or front the detection of the TSI is comparably primitive. As visualized in FIGS. 7B and 7C, when seen from rear the tiles within the left 50% portion of the ROI can be taken for detecting the left TSI, the right 50% portion of the ROI can be taken for detecting the right TSI. This means the ratio left to right is 50/50. Detecting the road participant's blinking side, which are seen from an angle such as road participants rear, right relative to the ego or equipped vehicle are seen from the front and the left such as the trucks in the example of FIG. 8A. At these often more than one turn indicator blinker may be visible at once and the side at which the blinking takes place is harder to tell since the ratio of front to side portion is depending on the viewing angle. Although all TSI's belonging to the identical side are typically blinking synchronously this cannot be used as the only distinguishing characteristic, since with 'hazard warning lights' on the left and the right side may also be blinking synchronously.

At vehicles seen in an angle, the line where to divide right from left is not in the middle but still in the middle of the front portion. The shape of the ROI taken from the classification alone may not sufficiently tell where the front portion ends and the side portion begins (see FIG. 8B). This becomes evident when looking at the vehicle indicated 'B' in FIG. 9, taken at the blind spot of the ego vehicle (by a side mirror mounted rearward directed camera with blind spot detection area close to 90 degrees). Vehicle B is at a relative angle of about 60 degrees to the ego vehicle. Due to the camera's fish eye lens, the vehicle appears additionally skewed. As visualized in FIG. 10, the front to side ratio of on vehicle in such an angle view is in the area of 10/90.

Figure 9:
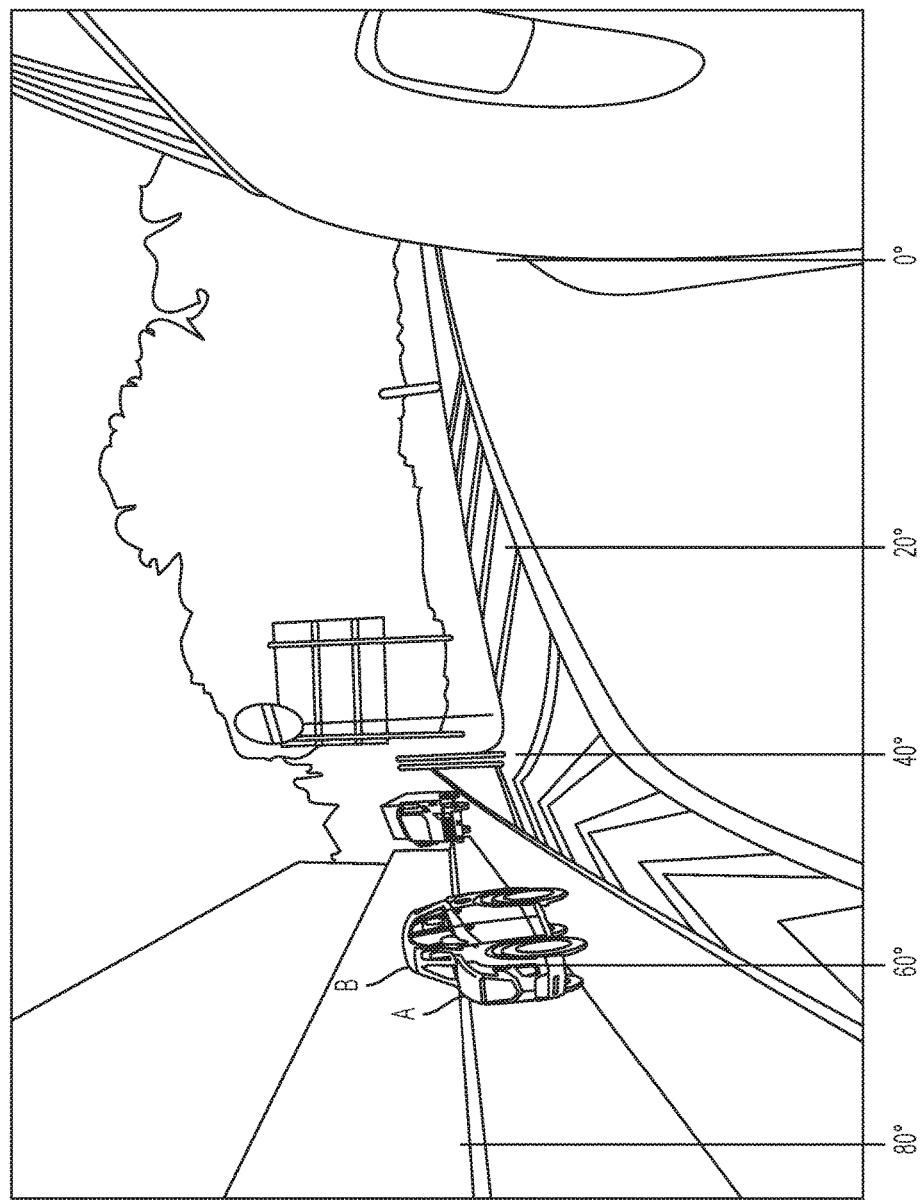
FIG. 9 is an image taken by a blind spot camera view of the ego vehicle (by a side mirror mounted rearward directed camera with blind spot detection area close to 90 degrees), with the angles relative to rearward being indicated.
Figure 10:
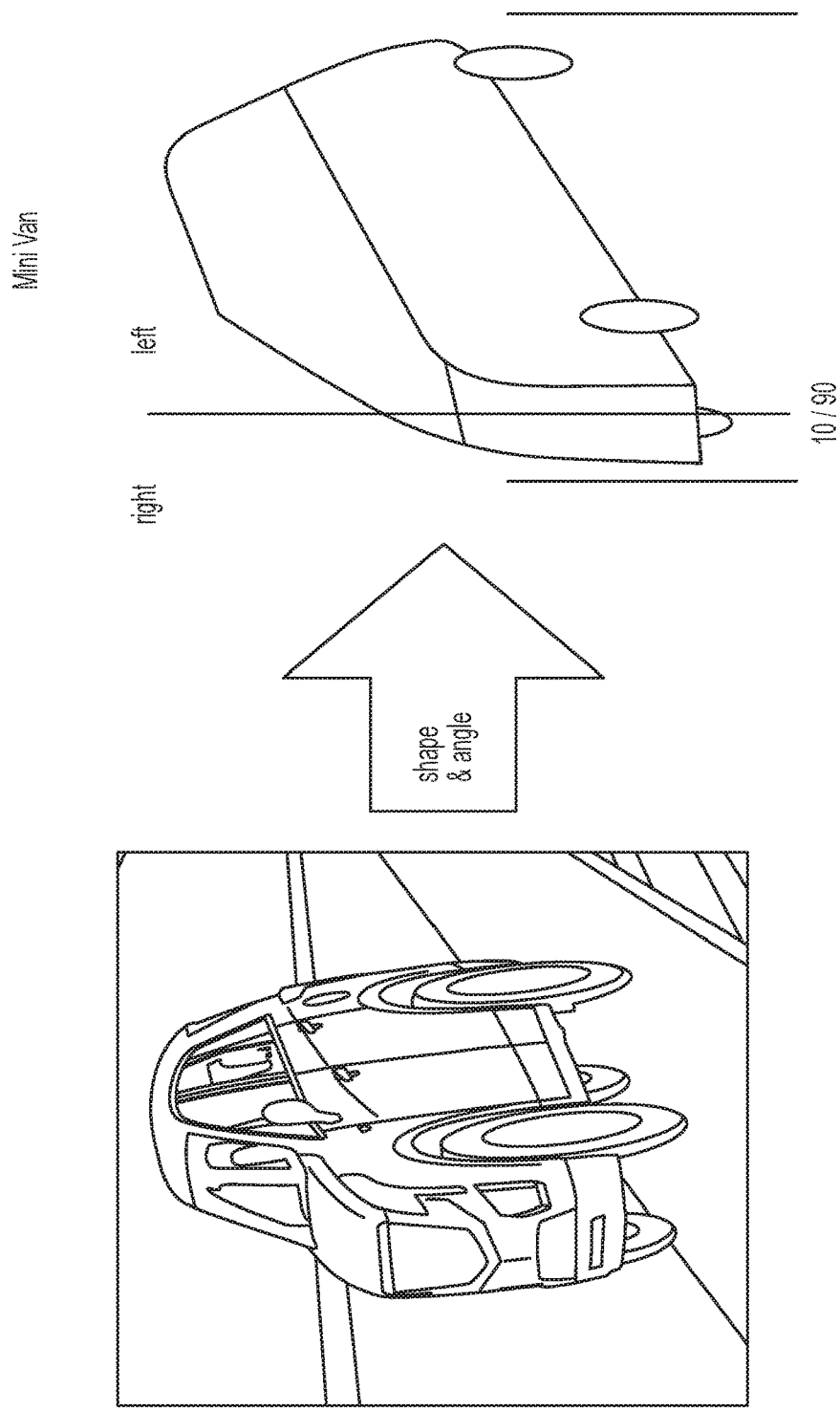
FIG. 10 is a cut out of the vehicle in view of FIG. 9 at the left and a result of the left/right divide up according the associated shape model (Mini Van) turn dedication (see also FIG. 7A and in step 'Left and right—ROI divide up by shape and rotation' in FIGS. 18 and 19)
Figure 17:
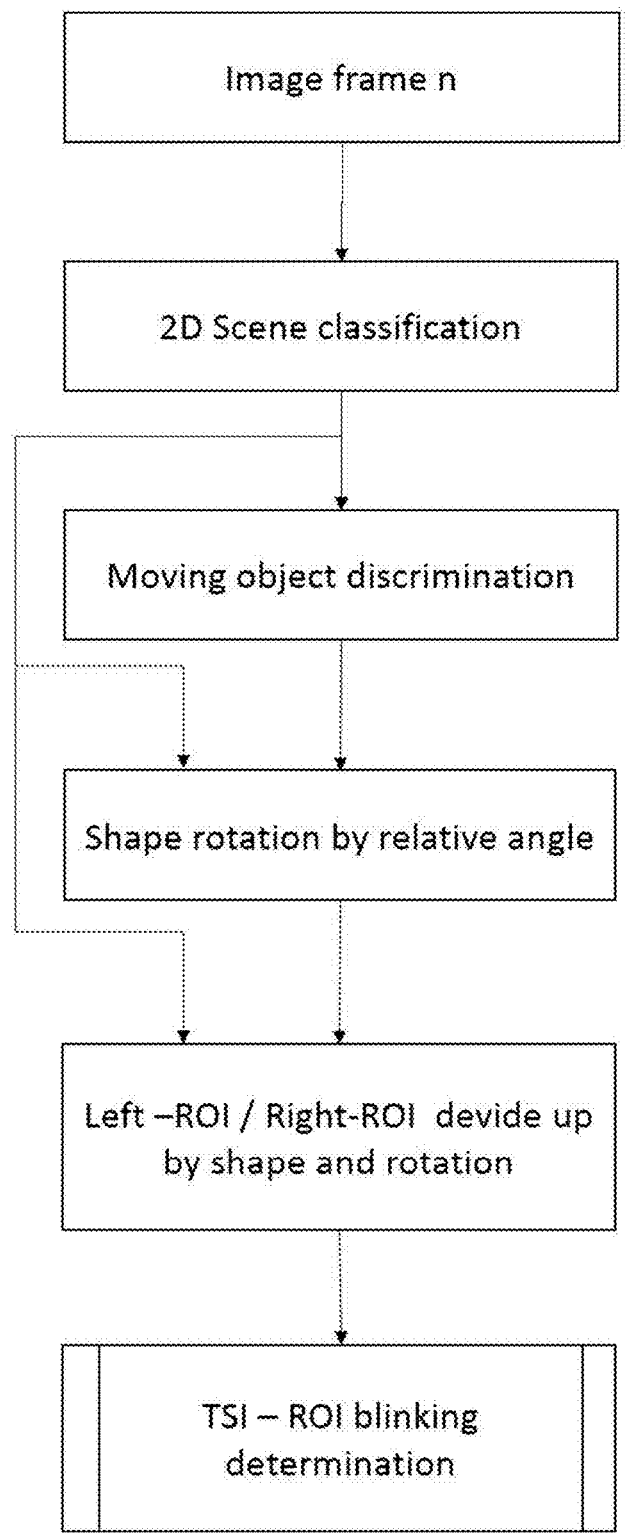
FIG. 17 is a flow chart of the basic aspects according the invention (FIGS. 20 and 21 show the content of the process 'ROI_blinking_determination'), using shape left to right divide up determination by using the angle from which the subject vehicle is seen in the ego vehicle camera (with known angle parameters)
Figure 18:
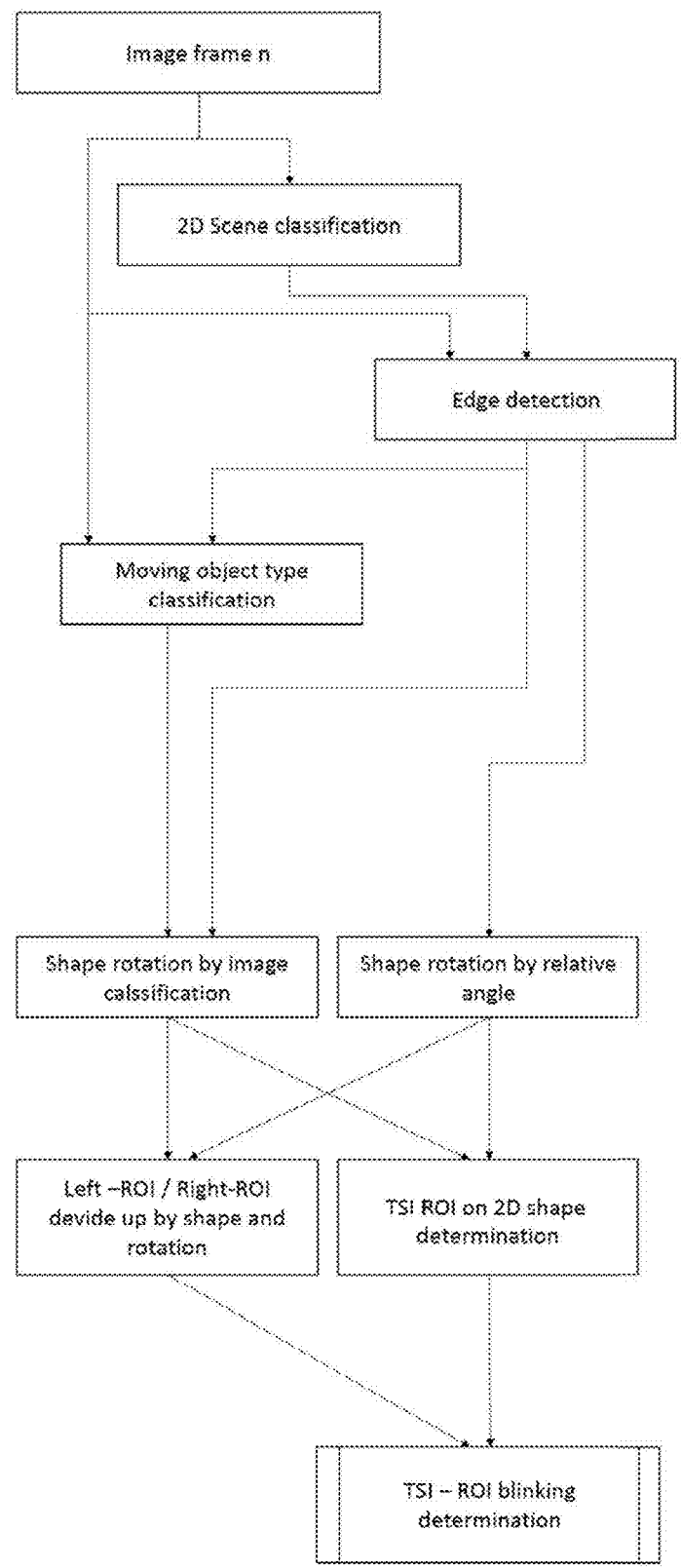
FIG. 18 is a flow chart of advanced aspects according the invention showing a turn signal indicator (TSI) ROI positioning determined from a rotational shape model (2D) which was enhanced by using edge detection and an object type classification.
Figure 19:
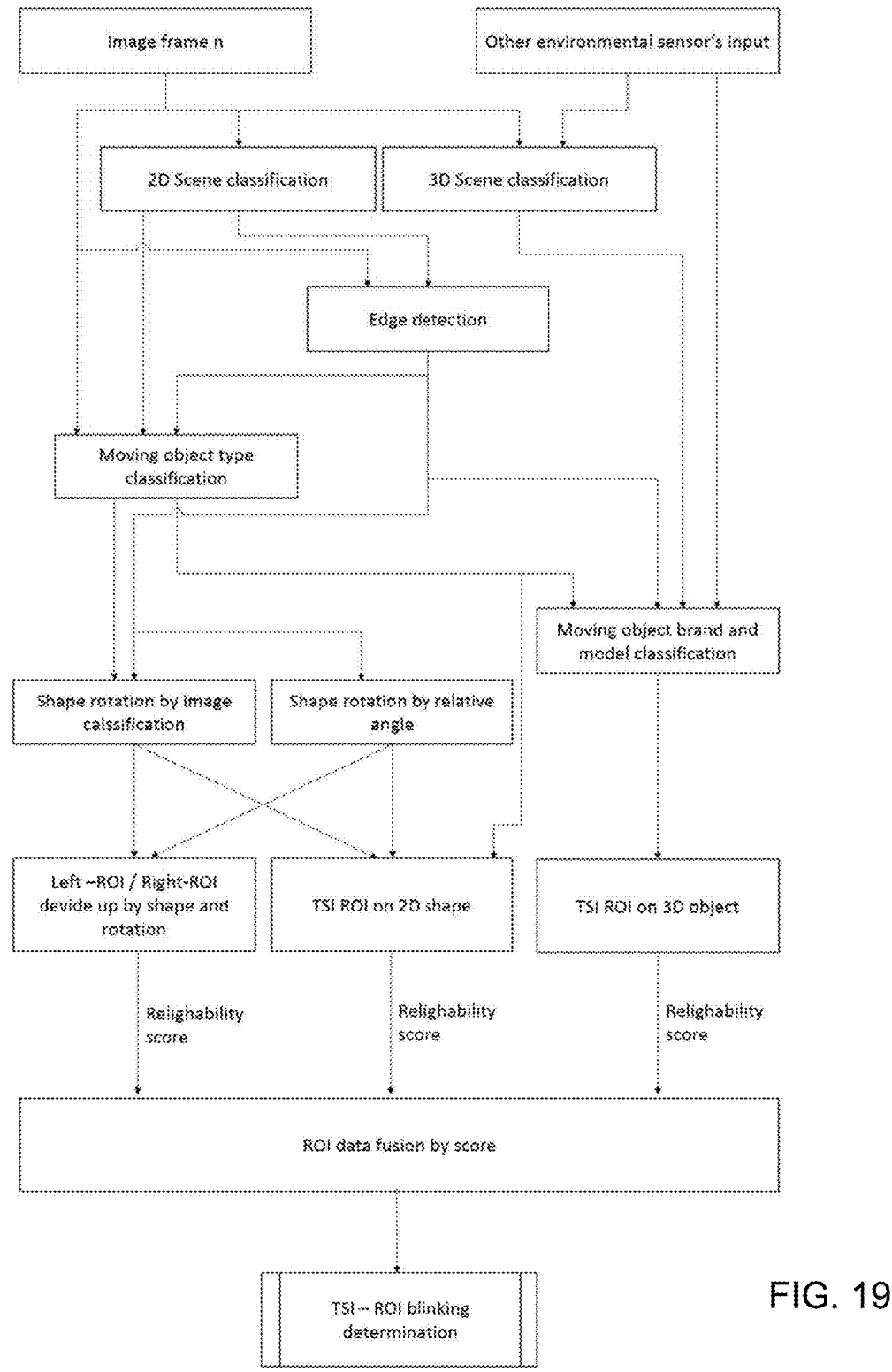
FIG. 19 is a flow chart of aspects according the invention showing a 3D-TSI ROI positioning determined from 'Moving Object brand and model classification' parallel to the above 2D methods, also showing a ROI data fusion that uses a reliability score from the three TSI ROI positioning procedures.
Figure 20:
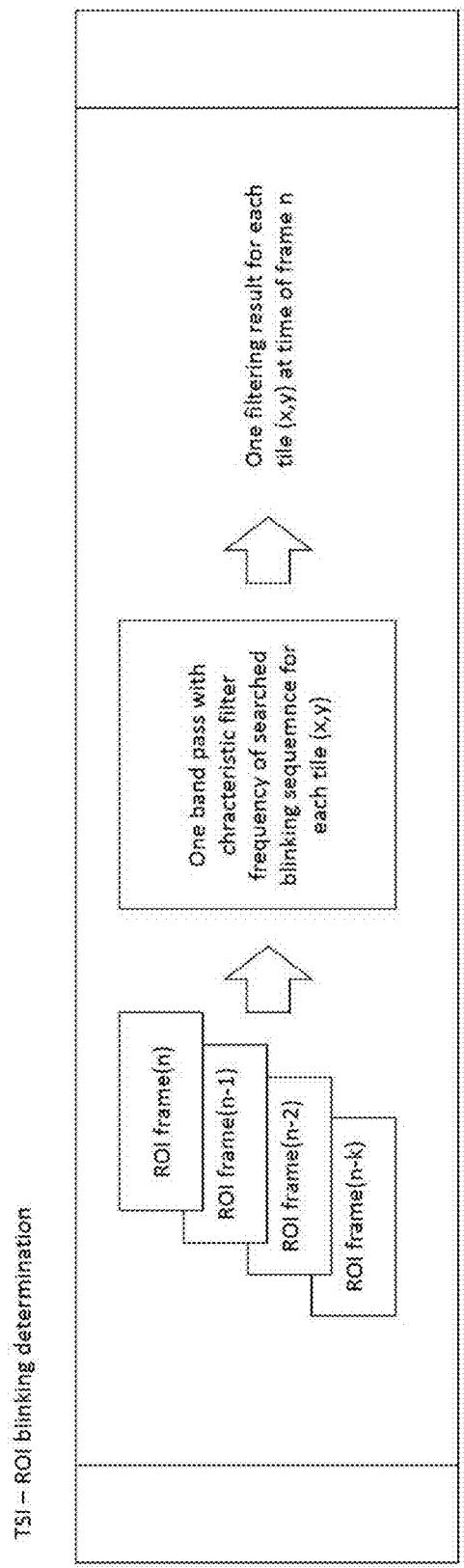
FIG. 20 is a flow chart of the details on the 'ROI_blinking_determination' which is content of the flow charts of FIGS. 17, 18 and 19, with each ROI's tile x,y has a single band pass which filters the brightness values over all past images k up to the to the current frame n, which results whether a blinking result was detected in the according tile or not.

To solve this it may be assumed that the actual ego lane and the adjacent past and proceeding lanes (so all lanes) are well known, detected by known art lane detection (possibly together with the rest of the scene, so scene detection in accordance with '2D Scene classification' in FIGS. 17, 18 and 19 or '3D Scene classification' in FIG. 19) systems and algorithms or given by precise (non-real time) maps. It can be assumed that the own and the foreign road participants directive orientation is substantially in alignment with its lane propagation. By knowing the perceiving camera's mounting point and viewing direction and by detecting the angle relative to the foreign road participants, the relative perspective can be assumed mostly sufficient (see step 'Shape rotation by angle' in FIGS. 17, 18 and 19). In case the systems lacks depth sensors (3D) or a depth estimation or calculation algorithm (according the flow charts of FIG. 17 or 18) so that the foreign vehicles cannot be localized to the surrounding scene map, detecting just their angle at which these are seen relative to the ego vehicle may give sufficient indication of the orientation of the foreign vehicles relative to the own vehicle, see FIG. 11. FIG. 9 shows examples out of the view of a side camera directed rearward.

By that the ratio between front portion and side portion of a road participant can be assumed and by that it can be detected whether a blinker may be mostly in the left third or the right third of a road participant's front and whether it is plausible that also side blinkers visible at the road participant's side portion.

Optionally, instead of determining the relative angles of foreign vehicles relative to the ego vehicle, the system of the invention may have an object classification algorithm which puts out the vehicles' surface portions such as 'left side', 'right side', 'front', 'rear' (and optionally also the 'top' when visible).

Figure 5C:
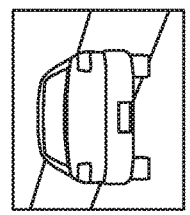
FIG. 5C shows the result of an edge filtering of the image of a subject vehicle.
Figure 7A:
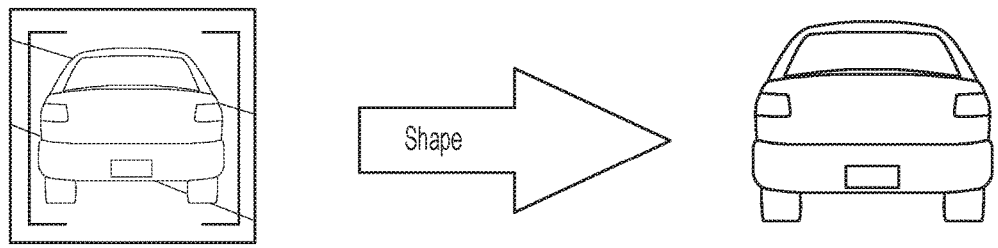
FIG. 7A shows the rotational shape of a vehicle in the bounding boxes being determined from the edge detection image from FIG. 5C.
Figure 7B:
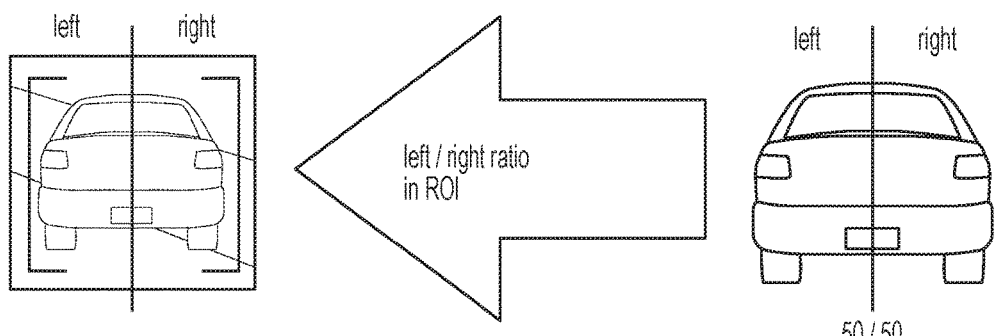
FIGS. 7B and 7C show the borderline at which the divide of left to right is set as determined by the rotational shape acquired in FIG. 7A and in step 'Left and right—ROI divide up by shape and rotation' in FIGS. 18 and 19.
Figure 7C:
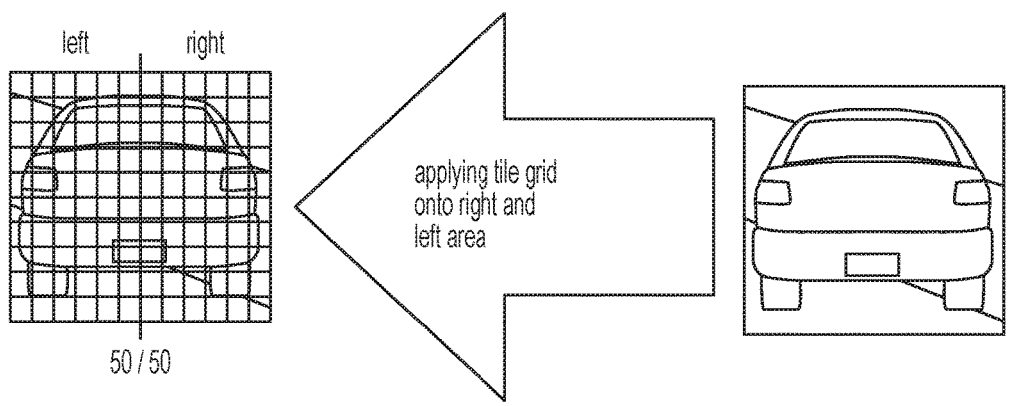
Figure 12:
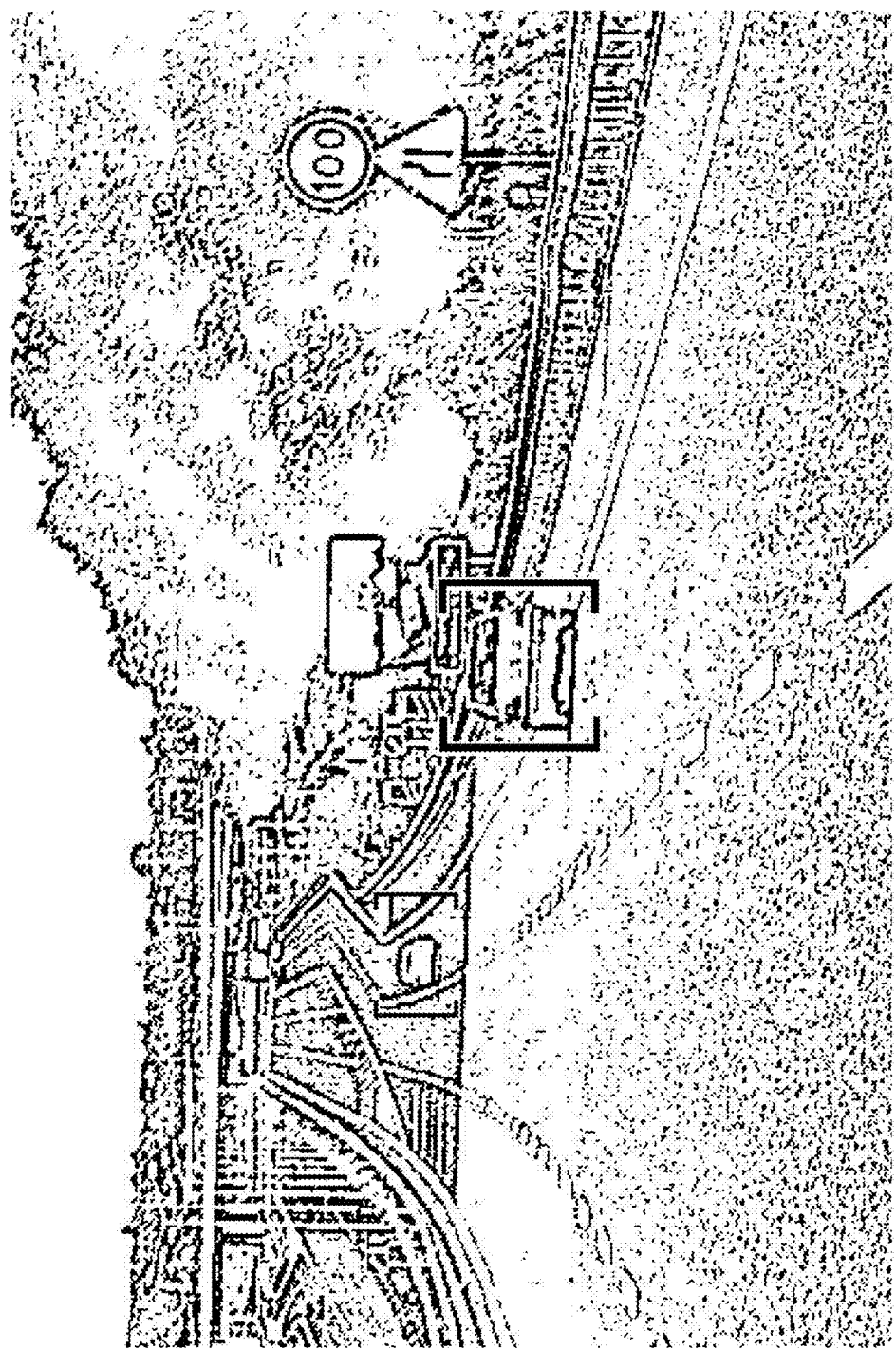
FIG. 12 shows a cropping of FIG. 3 past edge detection.

In an alternative option for improving the clear distinguishing between the front portion and side portion of a road participant seen from an angle, an object orientation classifier may come into use (see step 'Shape rotation by image classification' in the flow charts of FIGS. 18 and 19). It may have been trained by learning a typical road user's orientation together with its according shape. On run time the natural input image of the ROI may be classified. Optionally, to improve the vehicle shape determination from the background, the system according the invention may have an edge sharpening (e.g., high pas filter) or edge filtering algorithm (e.g., canny filter). FIG. 12 shows a (cropped) high pass filtered image of the source image FIG. 3 with bounding boxes around the foreign road objects of interest. FIG. 5C shows the edge filtering of just the fraction of the bounding box (If not the whole image gets edge filtered this may be the preferred alternative). The shape of the vehicles in the bounding boxes may be classified and the borderline at which the divide of left to right is to set may be determined upon that shape result such as shown in the charts of FIGS. 7A and 7B.

Figure 13:
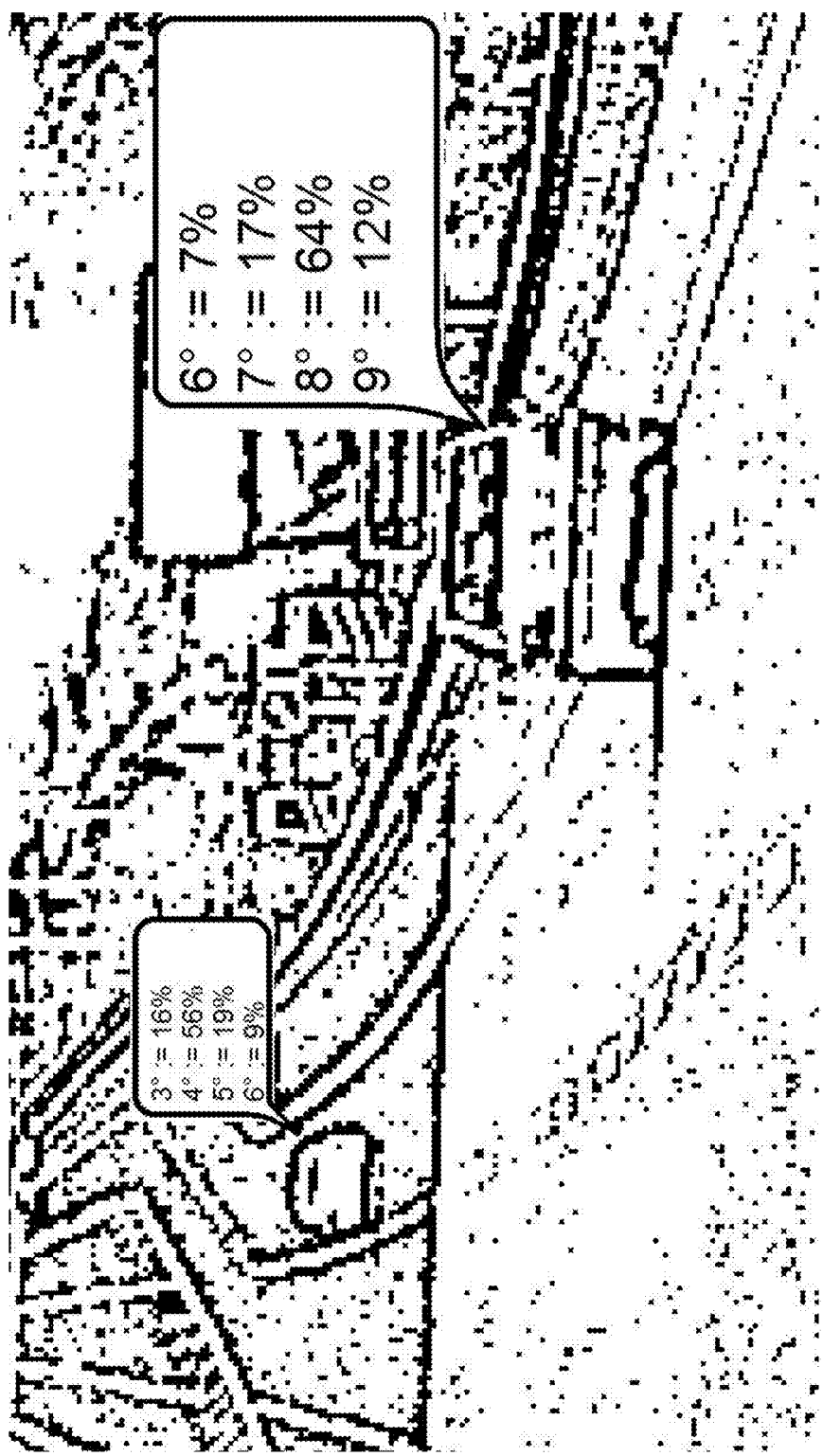
FIG. 13 shows a rotational shape model classified by a classifier that additionally outputs a confidence level of the rotation (and viewing) angles.
Figure 14:
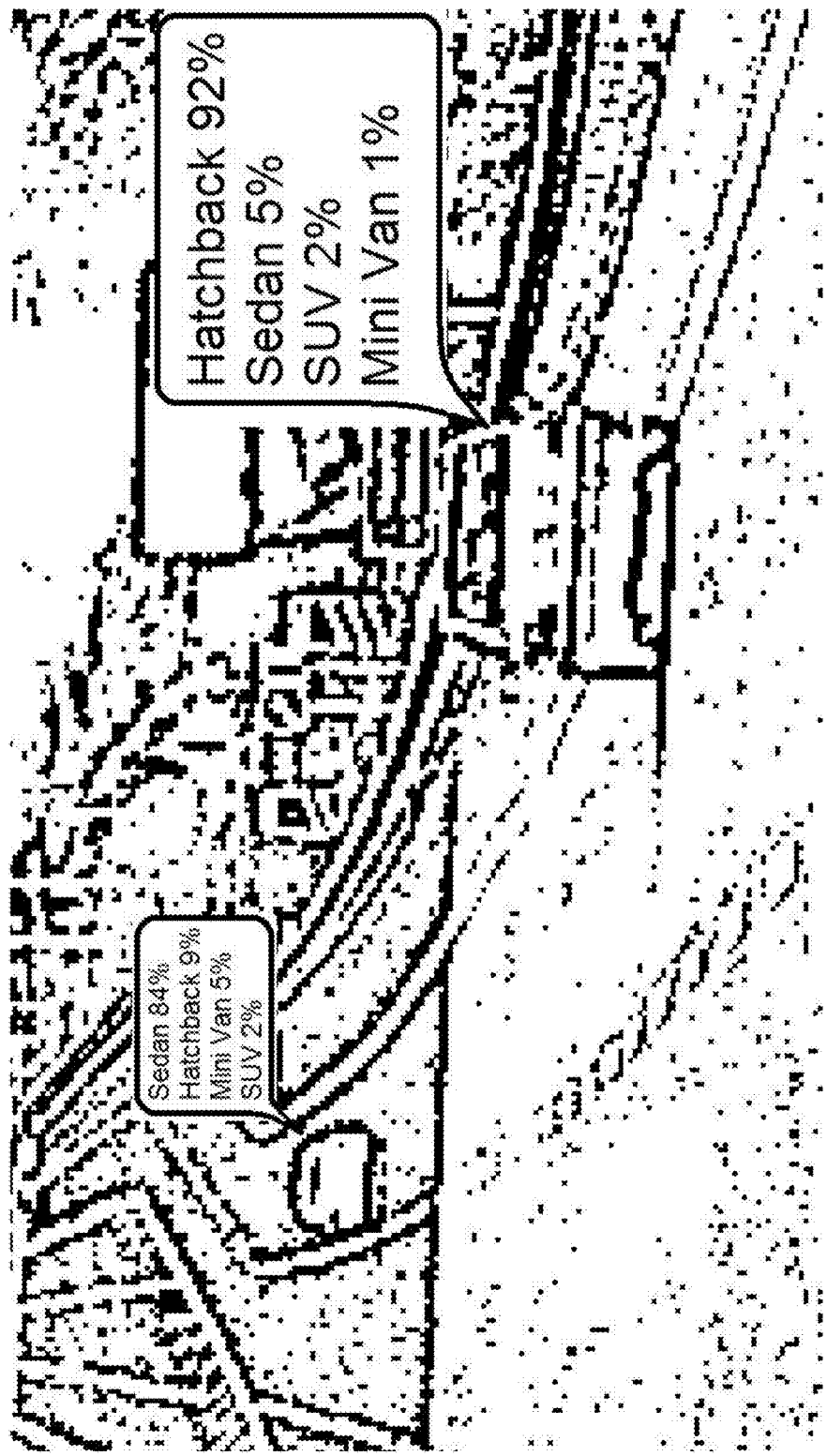
FIG. 14 shows an object classification algorithm according the invention that is able to classify the vehicle types, such as having classes for truck, trailer truck, pick up, SUV, Mini Van or Sedan type vehicles, with the classifier's results having confidence levels indicated.

Optionally, the classifier may output a confidence level at which viewing angle may apply most, such as indicated in FIG. 13. The angle with the highest score may be taken as the viewing angle for further processing. The processing frame's dedicated angles may be taken for plausifying the current frame since the viewing angle may not change abruptly (while passing an object). More sophisticated object classification algorithms according the invention may be able to classify the vehicle type, such as having classes for truck-, trailer truck-, pick up-, SUV-, Mini Van- or Sedan type vehicles (see step 'Moving object type classification' in the flow charts of FIGS. 18 and 19). FIG. 14 shows such a classifier's result with confidence levels indicated. The vehicle type result may be input to the rotational view or shape classifier (rotational shape model (2D)) so it is working more accurately.

Figure 15:
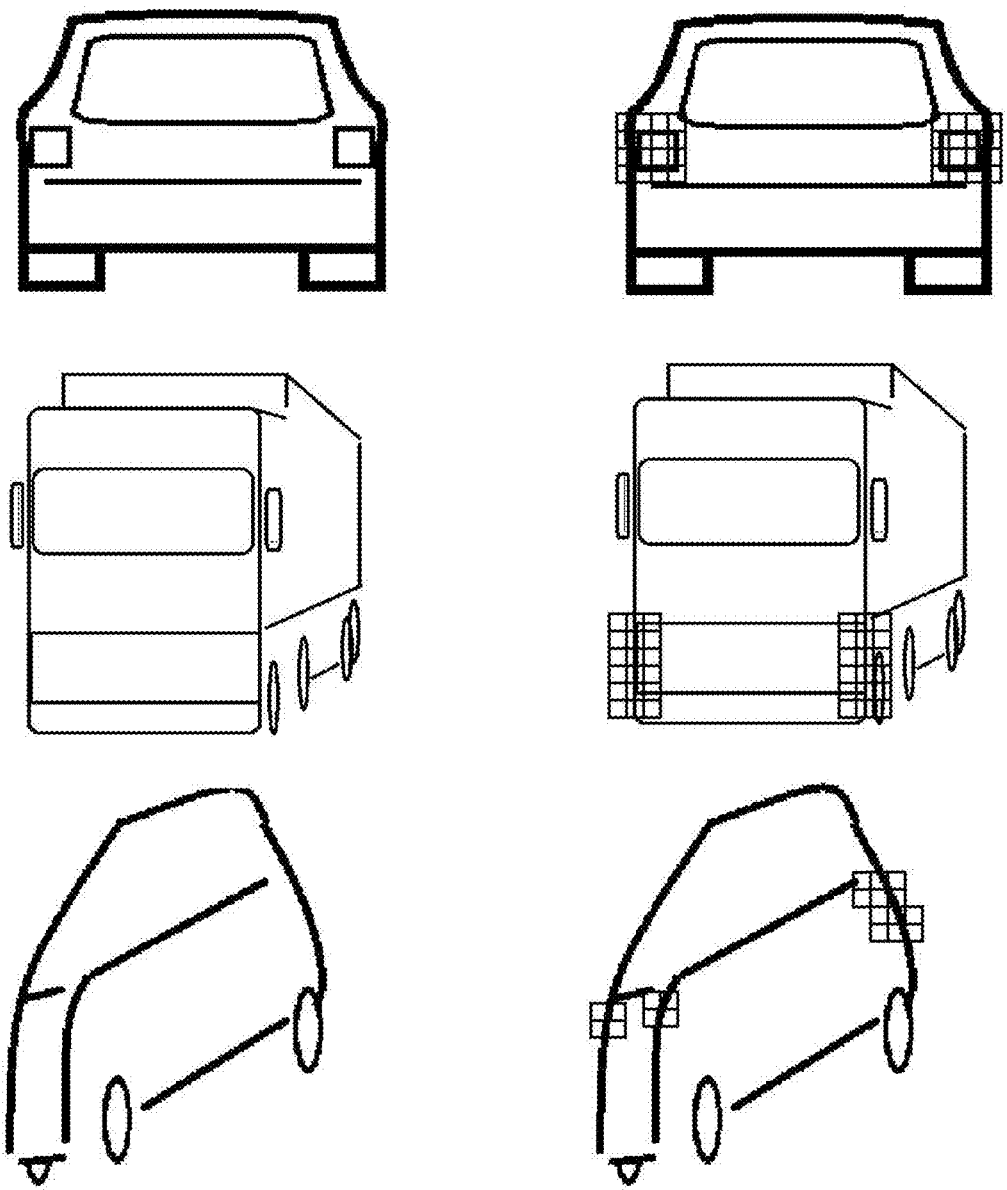
FIG. 15 shows that the areas of interest could have been reduced to small areas at which the blinking time pattern may get supervised for detection, where this can be the result of a rotational shape model (2D)

Optionally, the classifier may output the typical areas where at this type of vehicle the TSIs are to be found directly. FIG. 15 shows that the areas of interest could have been reduced to small areas at which the blinking time pattern may get supervised for detection. Optionally, the classifier may output the exact brand and type of any vehicle in view to pinpoint where the position of the TSIs is to be expected. Optionally, in case the system has the above mentioned depth sensors (3D) or depth estimation or calculation algorithms, the signal processing flow charts of FIG. 19 may be applied. It can be assumed that in the range the 3D detection works, the signals of the foreign moving object is strong enough to do a direct determination where the TSI ROI's positions on the object are determined (without shape analysis) due to the object's 3D orientation knowledge which is inherent the 3D scene classification or determination. Optionally, multiple 2D and 3D TSI-ROI position determination methods may be used at once, with the results fused by a fusing algorithm. As shown in FIG. 19, the fusion may be done via a reliability score and each TSI-ROI position determination method may produce generally or alternatively for each TSI-ROI. Some methods may be more reliable for far object's TSI ROI position detection while others may be preferred for close object's TSI ROI position detection.

Figure 16:
FIG. 16 shows the result of peak lights filtering done by image histogram manipulation.

Optionally, the peak lights may be enhanced by an image histogram manipulation so that the TSIs can get separated from the image clutter better (optionally just in the objects bounding box or ROI) as shown in the filtered image of FIG. 16. Optionally, a color filter for orange (Europe) and/or red (North America) may be used for reducing the amount of irrelevant peak lights in the camera's field of view. Optionally, the color filter may be tuned to red or orange according the vehicle classification (since in Europe there are also still red TSI's allowed).

Optionally, the system of the present invention may employ an anti-flicker filtering algorithm for improving the true positive blinker detection ratio. Optionally, the anti-flicker and TSI determination algorithm, systems and devices may be communized to one common system. Optionally, the TSI determination system may control or influence the camera color, camera brightness and/or HDR control parameters for optimizing TSI determination SNR.

Optionally, a system according the invention may have (ego-) vehicle control means to assist or intervene in case the ego vehicle is about to enter a lane that another relatively close (or still relatively distant but fast approaching) vehicle is also about to enter, such as discontinuing the lane change maneuver, but staying in the occupied lane and braking if necessary instead (in the example of FIG. 2, the "path chosen" is the path an automated or intervening system according the invention may take in combination with braking).

Therefore, the system of the present invention uses a vision system to detect and identify activated turn signal indicators of other vehicles present in the field of view of the camera at the equipped vehicle. The system processes image data captured by the camera to detect blinking or flashing, and determines whether or not the detected blinking is indicative of an activated turn signal indicator of a vehicle ahead or behind the equipped vehicle. Such determination is made responsive to a color of the detected blinking being within a threshold color range, the rate of flashing of the detected blinking being within a threshold rate, and/or the location of the detected blinking being within a threshold range of locations for another vehicle. The threshold(s) may be selected or adjusted responsive to the current geographical location of the equipped vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Optionally, the camera may comprise a forward facing camera, such as disposed at a windshield electronics module (WEM) or the like. The forward facing camera may utilize aspects of the systems described in U.S. Pat. Nos. 8,256,821; 7,480,149; 6,824,281 and/or 6,690,268, and/or U.S. Publication Nos. US-2015-0327398; US-2015-0015713; US-2014-0160284; US-2014-0226012 and/or US-2009-0295181, which are all hereby incorporated herein by reference in their entireties.

The system may also communicate with other systems, such as via a vehicle-to-vehicle communication system or a vehicle-to-infrastructure communication system or the like. Such car2car or vehicle to vehicle (V2V) and vehicle-to-infrastructure (car2X or V2X or V2I or 4G or 5G) technology provides for communication between vehicles and/or infrastructure based on information provided by one or more vehicles and/or information provided by a remote server or the like. Such vehicle communication systems may utilize aspects of the systems described in U.S. Pat. Nos. 6,690,268; 6,693,517 and/or 7,580,795, and/or U.S. Publication Nos. US-2014-0375476; US-2014-0218529; US-2013-0222592; US-2012-0218412; US-2012-0062743; US-2015-0251599; US-2015-0158499; US-2015-0124096; US-2015-0352953; US-2016-0036917 and/or US-2016-0210853, which are hereby incorporated herein by reference in their entireties.

The system may utilize sensors, such as radar sensors or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication Nos. US-2017-0222311 and/or US-2010-0245066 and/or U.S. patent applications, Ser. No. 15/685,123, filed Aug. 24, 2017, Ser. No.

15/675,919, filed Aug. 14, 2017, Ser. No. 15/647,339, filed Jul. 12, 2017, Ser. No. 15/619,627, filed Jun. 12, 2017, Ser. No. 15/584,265, filed May 2, 2017, Ser. No. 15/467,247, filed Mar. 23, 2017, and/or Ser. No. 15/446,220, filed Mar. 1, 2017, and/or International PCT Application No. PCT/IB2017/054120, filed Jul. 7, 2017, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or U.S. Publication Nos. US-2012-0162427; US-2006-0050018 and/or US-2006-0061008, which are all hereby incorporated herein by reference in their entireties.

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vision system for a vehicle, said vision system comprising:
   a camera disposed at a vehicle equipped with said vision system and having a field of view exterior of the equipped vehicle;
   a control having an image processor operable to process image data captured by said camera;
   wherein said control, via processing by said image processor of image data captured by said camera, detects presence of a vehicle in the field of view of said camera;
   wherein said control, via processing by said image processor of image data captured by said camera, determines an angle of the detected vehicle relative to the equipped vehicle;
   wherein, responsive to determination of the angle and via processing by said image processor of image data captured by said camera, said control determines a middle region of an end of the detected vehicle viewed by said camera;
   wherein the end of the detected vehicle viewed by said camera comprises a front end of the detected vehicle or a rear end of the detected vehicle, whichever is closer to the equipped vehicle and is being viewed by said camera;
   wherein said control determines the middle region of the end of the detected vehicle based at least in part on an expected ratio of the end of the detected vehicle to a side of the detected vehicle when viewed at the determined angle;
   wherein said control, via processing by said image processor of image data captured by said camera, detects presence of a blinking light source in the field of view of said camera;
   wherein, responsive to detection of a blinking light source, said vision system is operable to determine if the detected blinking light source is a turn signal indicator of the detected vehicle on a road on which the equipped vehicle is traveling based on a characteristic of the detected blinking light source being within a threshold level corresponding to a characteristic of a turn signal indicator of a vehicle; and
   wherein, responsive to determination that the detected blinking light source is a turn signal indicator of the detected vehicle, and responsive at least in part to determination of the middle region of the end of the detected vehicle, said control determines whether the determined turn signal indicator is a left turn signal indicator of the detected vehicle or a right turn signal indicator of the detected vehicle.

2. The vision system of claim 1, wherein said vision system determines that a detected blinking light source is a turn signal indicator of another vehicle on the road on which the equipped vehicle is traveling more than one lane away from a lane in which the equipped vehicle is traveling.

3. The vision system of claim 1, wherein said camera is disposed at a rear portion of the equipped vehicle has a field of view rearward of the equipped vehicle, and wherein the end of the detected vehicle viewed by said camera is a front end of the detected vehicle.

4. The vision system of claim 1, wherein said camera is disposed at a front portion of the equipped vehicle has a field of view forward of the equipped vehicle, and wherein the end of the detected vehicle viewed by said camera is a rear end of the detected vehicle.

5. The vision system of claim 1, wherein, responsive at least in part to determination of the middle region of the end of the detected vehicle, said control, via processing by said image processor of image data captured by said camera, determines whether the determined turn signal indicator is at a left side of the determined middle region of the end of the detected vehicle or at a right side of the determined middle region of the end of the detected vehicle.

6. The vision system of claim 1, wherein said vision system is operable to determine if the detected blinking light source is a turn signal indicator of the detected vehicle based on a color of the detected blinking light source being within a threshold color range.

7. The vision system of claim 1, wherein said vision system is operable to determine if the detected blinking light source is a turn signal indicator of the detected vehicle based on the rate of flashing of the detected blinking light source being within a threshold rate.

8. The vision system of claim 1, wherein said vision system is operable to determine if the detected blinking light source is a turn signal indicator of the detected vehicle based on the location of the detected blinking light source being within a threshold range of locations for another vehicle.

9. The vision system of claim 1, wherein the threshold level is selected or adjusted responsive to a current geographical location of the equipped vehicle.

10. The vision system of claim 1, wherein said control determines the middle region of the end of the detected vehicle viewed by said camera at least in part responsive to a determined distance to the detected vehicle.

11. A vision system for a vehicle, said vision system comprising:
- a camera disposed at a front portion of a vehicle equipped with said vision system and having a field of view forward and sideward of the equipped vehicle;
- a control having an image processor operable to process image data captured by said camera;
- wherein said control, via processing by said image processor of image data captured by said camera, detects presence of a leading vehicle ahead of the equipped vehicle and in the field of view of said camera;
- wherein said control, via processing by said image processor of image data captured by said camera, determines an angle of the detected vehicle relative to the equipped vehicle;
- wherein, responsive to determination of the angle and via processing by said image processor of image data captured by said camera, said control determines a middle region of a rear end of the detected vehicle viewed by said camera;
- wherein said control determines the middle region of the rear end of the detected vehicle based at least in part on an expected ratio of the rear end of the detected vehicle to a side of the detected vehicle when viewed at the determined angle;
- wherein said control, via processing by said image processor of image data captured by said camera, detects presence of a blinking light source in the field of view of said camera;
- wherein, responsive to detection of a blinking light source, said vision system is operable to determine if the detected blinking light source is a turn signal indicator of the detected vehicle on a road on which the equipped vehicle is traveling based on a characteristic of the detected blinking light source being within a threshold level corresponding to a characteristic of a turn signal indicator of a vehicle;
- wherein, responsive to determination that the detected blinking light source is a turn signal indicator of the detected vehicle, and responsive at least in part to determination of the middle region of the rear end of the detected vehicle, said control determines whether the determined turn signal indicator is a left turn signal indicator of the detected vehicle or a right turn signal indicator of the detected vehicle; and
- wherein said vision system determines that the detected blinking light source is a left or right turn signal indicator of another vehicle on the road on which the equipped vehicle is traveling more than one lane away from a lane in which the equipped vehicle is traveling.

12. The vision system of claim 11, wherein said vision system is operable to determine if the detected blinking light source is a turn signal indicator of the detected vehicle based on a color of the detected blinking light source being within a threshold color range.

13. The vision system of claim 11, wherein said vision system is operable to determine if the detected blinking light source is a turn signal indicator of the detected vehicle based on the rate of flashing of the detected blinking light source being within a threshold rate.

14. The vision system of claim 11, wherein the threshold level is selected or adjusted responsive to a current geographical location of the equipped vehicle.

15. The vision system of claim 11, wherein said control determines the middle region of the rear end of the detected vehicle viewed by said camera at least in part responsive to a determined distance to the detected vehicle.

16. A vision system for a vehicle, said vision system comprising:
- a camera disposed at a rear portion of a vehicle equipped with said vision system and having a field of view rearward and sideward of the equipped vehicle;
- a control having an image processor operable to process image data captured by said camera;
- wherein said control, via processing by said image processor of image data captured by said camera, detects presence of a trailing vehicle behind the equipped vehicle and in the field of view of said camera;
- wherein said control, via processing by said image processor of image data captured by said camera, determines an angle of the detected vehicle relative to the equipped vehicle;
- wherein, responsive to determination of the angle and via processing by said image processor of image data captured by said camera, said control determines a middle region of a front end of the detected vehicle viewed by said camera;
- wherein said control determines the middle region of the front end of the detected vehicle based at least in part on an expected ratio of the front end of the detected vehicle to a side of the detected vehicle when viewed at the determined angle;
- wherein said control, via processing by said image processor of image data captured by said camera, detects presence of a blinking light source in the field of view of said camera;
- wherein, responsive to detection of a blinking light source, said vision system is operable to determine if the detected blinking light source is a turn signal indicator of the detected vehicle on a road on which the equipped vehicle is traveling based on a characteristic of the detected blinking light source being within a threshold level corresponding to a characteristic of a turn signal indicator of a vehicle;
- wherein, responsive to determination that the detected blinking light source is a turn signal indicator of the detected vehicle, and responsive at least in part to determination of the middle region of the front end of the detected vehicle, said control determines whether the determined turn signal indicator is a left turn signal indicator of the detected vehicle or a right turn signal indicator of the detected vehicle; and
- wherein said vision system determines that the detected blinking light source is a left or right turn signal indicator of another vehicle on the road on which the equipped vehicle is traveling more than one lane away from a lane in which the equipped vehicle is traveling.

17. The vision system of claim 16, wherein said vision system is operable to determine if the detected blinking light source is a turn signal indicator of the detected vehicle based on a color of the detected blinking light source being within a threshold color range.

18. The vision system of claim 16, wherein said vision system is operable to determine if the detected blinking light source is a turn signal indicator of the detected vehicle based on the rate of flashing of the detected blinking light source being within a threshold rate.

19. The vision system of claim 16, wherein the threshold level is selected or adjusted responsive to a current geographical location of the equipped vehicle.

20. The vision system of claim 16, wherein said control determines the middle region of the front end of the detected vehicle viewed by said camera at least in part responsive to a determined distance to the detected vehicle.

\* \* \* \* \*